United States Patent Office 2,732,383
Patented Jan. 24, 1956

2,732,383
PREGNADIENES AND METHOD OF PREPARING THE SAME

Seymour Bernstein, Pearl River, and Ruddy Littell, Ridgefield Park, N. J., assignors to American Cyanamid Company, New York, N. Y., a corporation of Maine No Drawing. Application May 27, 1953, Serial No. 357,902

1 Claim. (Cl. 260—397.45)

This invention relates to new pregnadienes. More particularly, it relates to $\Delta^{4,9(11)}$-pregnadienes and methods of preparing the same.

The discovery of the highly desirable activity of cortisone in the treatment of rheumatic diseases and other pathological conditions greatly stimulated interest in the steroid field. Recently new methods of preparing cortisone through fermentation of compounds such as $\Delta^4$-pregnene-17α,21-diol-3,20-dione (Reichstein's Substance S) to produce 11-epi-hydrocortisone have received wide spread interest. Also, derivatives of Reichstein's Substance S are reported in the literature to have activity greater than cortisone. Reichstein's Substance S, therefore, is becoming increasingly important since it can be converted into cortisone in a few steps and also transformed into derivatives having activity greater than cortisone.

The compounds of the present invention can be illustrated by the following structural formula:

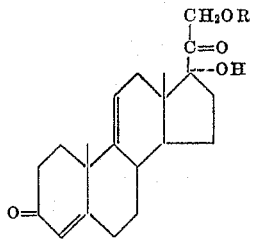

in which R is a member of the group consisting of hydrogen and lower alkanoyl radicals.

These compounds are soluble in organic solvents such as acetone, methanol and the like, and are relatively insoluble in petroleum ether and water. They have comparatively high melting points.

The compounds of the present invention are prepared by reacting $\Delta^5$-pregnene-11β,17α,21-triol-3,20-dione-21-acetate-3,20-di-ethylene ketal with a dehydrating agent under alkaline conditions and subsequently removing the protective groups by hydrolysis with dilute acid.

The intermediates used in the process of the present invention are described and claimed in the United States Patent 2,622,081 of one of us. This intermediate is then reacted with a lower alkanoic acid or anhydride thereof to esterify the hydroxyl radical in the 21-position. The product thus obtained, for example, when using acetic anhydride and pyridine is $\Delta^5$-pregnene-11β,17α,21-triol-3,20-dione-21-acetate-3,20-di-ethylene ketal. This compound is then reacted with a dehydrating agent such as phosphorous oxychloride under alkaline conditions. This is usually accomplished by carrying out the reaction in an alkaline solvent such as pyridine. It is desirable that the reaction be carried out under alkaline conditions since the ethylene ketal groups tend to hydrolyze and produce the original ketone under acid conditions.

After the desired $\Delta^{5,9(11)}$-pregnadiene is obtained the protective ketal groups are removed by hydrolysis in a solvent in the presence of a mineral acid and water. The solvent may be alcohols such as methyl, ethyl, propyl, butyl or amyl alcohol, dioxane or a ketone such as acetone, methyl ethyl ketone and the like. The preferred mineral acid is sulfuric acid, although other mineral acids such as hydrochloric acid can be used.

In carrying out the dehydration step to produce a double bond in the 9(11)-position of the steroid nucleus we prefer to run the reaction at room temperature, however, the reaction may be carried out at a temperature of from 5° to about 75° C. In subsequently removing the protective groups it is usually desirable to carry out the reaction at the refluxing temperature of the solvent used. However, if desired, a temperature of from 20° to about 150° C. can be used.

In recovering the product from the reaction mixture it is desirable first to neutralize it with mild alkali such as, for example, sodium bicarbonate. The solvent is then removed by evaporation under reduced pressure. The desired compound crystallizes and can be further purified by recrystallization from organic solvents or a mixture of organic solvents such as acetone-petroleum ether.

The compounds of the present invention are very useful since in the form of the acetate or similar ester they can be reacted with N-bromoacetamide to give 9-alpha,bromo-Kendall's Compound F acetate. This compound, on reaction with potassium acetate, produces 9-beta,11-beta oxido Reichstein's Substance S acetate which on reaction with hydrochloric acid, will produce 9-alpha-chloro-Kendall's Compound F acetate. This latter compound is reported in the literature to be more active than cortisone.

The following examples illustrate the preparation of $\Delta^{4,9(11)}$-pregnadiene-17α,21-diol-3,20-dione and esters thereof.

Example 1

The di-ethylene ketal of Kendall's Compound F ($\Delta^5$-pregnene-11β,17α,21-triol-3,20-dione-3,20-di-ethylene ketal) (0.8 g.) in 2 ml. of pyridine was treated with 2 ml. of acetic anhydride. The mixture was allowed to stand at room temperature overnight when it was poured into ice water. The resulting oil solidified on standing and the crystals were collected and washed with water; 0.86 g. Recrystallization from acetone gave 0.6 g. of $\Delta^5$-pregnene-11β,17α,21-triol-3,20-dione-21-acetate-3,20-di-ethylene ketal; melting point 199°–201°; $[\alpha]_D^{27}$—26° (chloroform).

The di-ethylene ketal of Kendall's Compound F acetate (prepared above) (100 mg.) in 1 ml. of pyridine was treated in the cold with 0.082 ml. of phosphorous oxychloride and the mixture was allowed to stand at room temperature for 64 hours. Water was added to the cooled mixture and the resulting crystals were collected; 84 mg. One recrystallization from acetone-petroleum ether (boiling point 64°–66°) gave 67 mg., (70% yield). Two further recrystallizations gave 49 mg., melting point 198°–199°;

$$\lambda_{maximum}^{absolute\ alcohol}$$

none; negative Beilstein test for halogen; $[\alpha]_D^{22}$—13.5° (chloroform).

A solution of $\Delta^{5,9(11)}$-pregnadiene-17α,21-diol-3,20-dione-21-acetate-3,20-di-ethylene ketal (250 mg.), prepared above, in 20 ml. of ethanol was treated with 2.5 ml. of 8.5% (v./v.) sulfuric acid and the mixture was refluxed for one hour. Methanol was added; the solution was neutralized with sodium bicarbonate and filtered. The filtrate was concentrated under reduced pressure until crystals separated. Water was added and the crude product was collected; 147 mg., melting point 239°–241° d., with previous softening. Five recrystallizations from acetone-petroleum ether (boiling point 64°–66°) to constant melting point afforded 21 mg. of pure $\Delta^{4,9(11)}$-pregnadiene-17α,21-diol-3,20-dione; melting point 259°–260° d., with previous softening;

$\lambda_{maximum}^{absolute\ alcohol}$ 237.5–239 mμ, ε16,000.

Example 2

A solution of $\Delta^{5,9(11)}$-pregnadiene-17α,21-diol-3,20-dione-21-acetate-3,20-di-ethylene ketal (560 mg.) in 15 ml. of two and one-half percent alcoholic potassium hydroxide was refluxed for one-half hour, treated with water and cooled. The crystals were collected. Recrystallization from acetone-petroleum ether (boiling point 64°–66°) gave 425 mg. (83% yield) of pure $\Delta^{5,9(11)}$-pregnadiene-17α,21-diol-3,20-dione-3,20-di-ethylene ketal, melting point 198°–200°.

A solution of $\Delta^{5,9(11)}$-pregnadiene-17α,21-diol-3,20-dione-3,20-di-ethylene ketal (375 mg.) in 25 ml. of methanol was treated with 3 ml. of 8.5% (v./v.) sulfuric acid and the mixture was refluxed for one hour. Addition of water followed by cooling gave 265 mg., melting point 245°–246°. Recrystallization from acetone-petroleum ether (boiling point 64°–66°) gave pure $\Delta^{4,9(11)}$-pregnadiene-17α,21-diol-3,20-dione; 220 mg. (73% yield), melting point 259°–261° d., with previous softening; positive blue tetrazolium test for α-ketol moiety; $[\alpha]_D^{23}+87°$ (pyridine).

Example 3

Thirty-eight milligrams of $\Delta^{4,9(11)}$-pregnadiene-17α,21-diol-3,20-dione in 2 ml. of pyridine was treated with 1 ml. of acetic anhydride and the mixture was allowed to stand at room temperature for 15 hours. Ether was added; the mixture was cooled, and the crystals were collected; 41 mg., melting point 235°–236° with previous softening. Two recrystallizations from acetone-ether gave 20 mg. of pure $\Delta^{4,9(11)}$-pregnadiene-17α,21-diol-3,20-dione-21-acetate, melting point 239.5°–241°, with previous softening, $[\alpha]_D^{23}+119.5°$ (chloroform).

We claim:

A method of preparing $\Delta^{4,9(11)}$-pregnadiene-17α,21-diol-3,20-dione which comprises reacting $\Delta^5$-pregnene-11β,17α,21-triol-3,20-dione-21-acetate-3,20-di-ethylene ketal with phosphorous oxychloride in an alkaline solvent, subsequently hydrolyzing the reaction product under acid conditions and recovering said product therefrom.

References Cited in the file of this patent

UNITED STATES PATENTS

| | | |
|---|---|---|
| 2,409,798 | Reichstein | Oct. 22, 1946 |
| 2,640,838 | Wendler et al. | June 2, 1953 |
| 2,707,190 | Farrar | Apr. 26, 1955 |